Patented Dec. 2, 1947

2,431,940

UNITED STATES PATENT OFFICE 2,431,940

DEALKYLATION OF HYDROCARBONS

Robert M. Kennedy, Drexel Hill, and Stanford J. Hetzel, Cheltenham, Pa., assignors to Sun Oil Company, Philadelphia, Pa., a corporation of New Jersey No Drawing. Application December 28, 1945, Serial No. 637,788

11 Claims. (Cl. 260—672)

This invention relates to the dealkylation of substituted cyclic hydrocarbons employing a novel catalyst consisting essentially of silica gel, alumina and nickel.

According to the invention a substituted monocyclic aromatic hydrocarbon, other than a monomethyl aromatic hydrocarbon, and a substituted polycyclic aromatic hydrocarbon, other than a mono-methyl aromatic hydrocarbon, or mixtures thereof, can be dealkylated to a substantial extent with good yields, under dealkylating conditions, employing a catalyst consisting essentially of a major proportion of silica gel and minor proportions of alumina and nickel. For example, xylene, mesitylene, amyl benzene, diisopropyl benzene, diethyl benzene, or mixtures thereof, have been dealkylated with commercially acceptable yields. Also, substituted naphthalenes, e. g. amyl naphthalene and the like can be dealkylated.

According to the invention the hydrocarbon to be dealkylated is contacted at an elevated temperature with a catalyst consisting essentially of silica gel, nickel and alumina.

The temperature employed is within the range 200° C.–700° C., preferably within the range 400° C.–500° C., more preferably in the neighborhood of 450° C.

The pressure employed is within the range atmospheric–200 lbs./sq. in., preferably 50 lbs./sq. in.–150 lbs./sq. in., more preferably in the neighborhood of 70 lbs./sq. in. This pressure is obtained and maintained with hydrogen gas. Other pressures are not excluded from the scope of the invention.

The time of contact or charging rate is readily determined experimentally depending upon the extent of dealkylation desired to be accomplished. For example, in one dealkylation operation, employing secondary amyl benzene, the time of contact or charging rate was 0.87 volume of secondary amyl benzene/volume of catalyst/hour. Generally, charging rates within the range 0.1 gram/minute/100 grams catalyst–10 grams/minute/100 grams catalyst have been employed with good results. Other charging rates are not excluded from the scope of the invention.

It is to be noted that contact time and temperature are interrelated to an extent in that with increasing temperature higher charging rates or lower contact time can be employed.

The dealkylation is performed in the presence of hydrogen to avoid the formation of undesired products.

The following table illustrates results obtained according to the invention.

| Charge | Catalyst Ni, Al$_2$O$_3$-SiO$_2$ | Conditions | | | Yield, Wt., per cent | |
|---|---|---|---|---|---|---|
| | | Temp., °C. | H$_2$ Press P.s.i. | Rate[1] | Total Liquid Hydrocarbon Per cent | Per cent below boiling point of charge |
| Sec-Amyl benzene | 5:5:90 | 300 | 45 | 0.0061 | 72.6 | 52.6 |
| Diisopropyl benzene | 5:5:90 | 300 | 45 | 0.0062 | 52.4 | 33.8 |
| p-Cymene | 5:5:90 | 300 | 100 | 0.088 | 82.3 | 40.6 |
| Diethyl benzene | 5:5:90 | 500 | 60 | .01 | 71.5 | 6.4 |
| Mesitylene | 5:5:90 | 500 | 60 | .011 | 38.1 | 12.6 |

[1] Rate, gm. charge/min./gm. Catalyst.

A catalyst employed according to the invention is prepared by impregnating silica gel particles, of size desired, with a water or other solution of aluminum and nickel salts. In one method of preparation solutions of aluminum and nickel nitrates, of desired concentrations, were added to a known quantity of silica gel, of desired particle size, in an evaporating dish. The mixture was evaporated to dryness, with stirring, and then ignited for about eight to ten hours, or until the salts were completely decomposed. This was followed by reduction with hydrogen at elevated temperature.

In copending application Serial No. 625,692, filed October 30, 1945, there is described and claimed a composition suitable as a catalytic agent consisting by weight of 80%–99.98% silica gel, 0.01%–10% alumina and 0.01%–10% nickel. That composition is suitable to the purpose of the present invention. Generally, a catalyst composition essentially consisting by weight of not less than about 90% silica gel, not more than about 10% nickel and a substantially smaller but appreciable quantity of alumina can be employed.

It will be understood by those versed in the art that wide variation within the scope of the appended claims is possible, the essence of the invention being in that substituted aromatic hydrocarbons, other than mono-methyl aromatic hydrocarbons, and substituted polycyclic aromatic hydrocarbons, other than mono-methyl aromatic hydrocarbons, or mixtures thereof, can be dealkylated employing a catalyst consisting essentially of silica gel, alumina and nickel.

We claim:

1. The dealkylation of a substituted aromatic hydrocarbon, other than a mono-methyl aromatic hydrocarbon, by contacting said hydrocarbon under dealkylating conditions in the presence of hydrogen with a catalyst consisting essentially of silica gel, alumina and nickel.

2. The dealkylation of a substituted aromatic hydrocarbon, other than a mono-methyl aromatic hydrocarbon, by contacting said hydrocarbon under dealkylating conditions in the presence of hydrogen with a catalyst consisting essentially of a major proportion of silica gel and minor proportions of alumina and nickel.

3. The dealkylation of a substituted aromatic hydrocarbon, other than a mono-methyl aromatic hydrocarbon, by contacting said hydrocarbon under dealkylating conditions in the presence of hydrogen with a catalyst essentially consisting by weight of 80%–99.98% silica gel, 0.01%–10% alumina and 0.01%–10% nickel.

4. The dealkylation of a substituted aromatic hydrocarbon, other than a mono-methyl aromatic hydrocarbon, by contacting said hydrocarbon under dealkylating conditions in the presence of hydrogen with a catalyst essentially consisting by weight of not less than 90% silica gel, not more than about 10% nickel and a substantially smaller but appreciable quantity of alumina.

5. The dealkylation of a substituted aromatic hydrocarbon, other than a mono-methyl aromatic hydrocarbon, by contacting said hydrocarbon at a temperature in the range of 200° C.–700° C. and in the presence of hydrogen with a catalyst essentially consisting by weight of 80%–99.98% silica gel, 0.01%–10% alumina and 0.01%–10% nickel.

6. A process according to claim 5 wherein the pressure is maintained within the range atmospheric–200 lbs./sq. in.

7. The dealkylation of a substituted benzene, other than toluene, by contacting said hydrocarbon under dealkylating conditions in the presence of hydrogen with a catalyst essentially consisting of a major proportion of silica gel and minor proportions of alumina and nickel.

8. A process according to claim 7 wherein the temperature is maintained within the range 400° C.–500° C., and the pressure is maintained within the range 50 lbs./sq. in.–150 lbs./sq. in.

9. The dealkylation of a substituted naphthalene, other than mono-methyl naphthalene, by contacting said hydrocarbon under dealkylating conditions in the presence of hydrogen with a catalyst essentially consisting of a major proportion of silica gel and minor proportions of alumina and nickel.

10. A process according to claim 8 wherein the temperature is maintained within the range 400° C.–500° C., and the pressure is maintained within the range 50 lbs./sq. in.–150 lbs./sq. in.

11. The dealkylation of a substituted cyclic hydrocarbon, other than a mono-methyl cyclic hydrocarbon, by contacting said hydrocarbon under dealkylating conditions in the presence of hydrogen with a catalyst consisting essentially of a major proportion of silica gel and minor proportions of alumina and nickel.

ROBERT M. KENNEDY.
STANFORD J. HETZEL.

REFERENCES CITED

The following references are of record in the file of this patent:

UNITED STATES PATENTS

| Number | Name | Date |
|---|---|---|
| 2,295,672 | Meharg et al. | Sept. 15, 1942 |
| 2,395,199 | Schulze et al. | Feb. 19, 1946 |
| 2,083,895 | Connolly | June 15, 1937 |

OTHER REFERENCES

Yukhnovskii, Ukrainskii Khem.-Zhurnal 3, No. 2 Pt tech 65–87 (1928). (Copy in Library of Congress.)

C. A. 23, 377–8. (Copy in Patent Office Library.)